(12) United States Patent
Fox et al.

(10) Patent No.: US 7,404,149 B2
(45) Date of Patent: Jul. 22, 2008

(54) USER-DEFINED ASSISTIVE GUI GLUE

(75) Inventors: James E. Fox, Apex, NC (US); Robert C. Leah, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 789 days.

(21) Appl. No.: 10/403,907

(22) Filed: Mar. 28, 2003

(65) Prior Publication Data

US 2004/0189714 A1 Sep. 30, 2004

(51) Int. Cl.
G06F 3/00 (2006.01)
G06F 9/00 (2006.01)
G06F 17/00 (2006.01)

(52) U.S. Cl. .................. 715/810; 715/763; 715/856

(58) Field of Classification Search .......... 715/856, 715/974, 754, 762, 764, 810, 763; 345/157, 345/159, 810; 354/157, 159
See application file for complete search history.

(56) References Cited

U.S. PATENT DOCUMENTS

| 5,191,641 | A |  | 3/1993 | Yamamoto et al. |
| 5,374,942 | A |  | 12/1994 | Gilligan et al. |
| 5,432,531 | A |  | 7/1995 | Calder et al. |
| 5,473,343 | A |  | 12/1995 | Kimmich et al. |
| 5,508,717 | A |  | 4/1996 | Miller |
| 5,559,943 | A |  | 9/1996 | Cyr et al. |
| 5,710,574 | A |  | 1/1998 | Jaaskelainen, Jr. |
| 5,732,228 | A |  | 3/1998 | Jaaskelainen, Jr. |
| 5,760,763 | A |  | 6/1998 | Ainsburg |
| 5,786,805 | A |  | 7/1998 | Barry |
| 5,808,601 | A |  | 9/1998 | Leah et al. |
| 5,880,717 | A | * | 3/1999 | Chan et al. ................. 345/173 |
| 5,898,434 | A | * | 4/1999 | Small et al. ................. 715/810 |
| 5,963,191 | A | * | 10/1999 | Jaaskelainen, Jr. ......... 715/856 |
| 5,986,639 | A |  | 11/1999 | Ozawa et al. |
| 5,990,862 | A | * | 11/1999 | Lewis ......................... 715/858 |
| 6,005,566 | A | * | 12/1999 | Jones et al. ................. 715/788 |
| 6,025,833 | A |  | 2/2000 | Duff |
| 6,040,821 | A | * | 3/2000 | Franz et al. ................. 345/159 |
| 6,115,029 | A |  | 9/2000 | Jaaskelainen, Jr. et al. |
| 6,181,325 | B1 |  | 1/2001 | Lee |
| 6,295,049 | B1 |  | 9/2001 | Minner |
| 6,313,825 | B1 | * | 11/2001 | Gilbert ........................ 345/156 |
| 6,466,197 | B1 | * | 10/2002 | Kim et al. .................... 345/156 |
| 6,466,199 | B2 |  | 10/2002 | Takase et al. |
| 6,664,989 | B1 | * | 12/2003 | Snyder et al. ............... 715/856 |
| 2004/0017355 | A1 | * | 1/2004 | Shim ........................... 345/157 |

* cited by examiner

*Primary Examiner*—Tadesse Hailu
*Assistant Examiner*—Anita D Chaudhuri
(74) *Attorney, Agent, or Firm*—Marcia L. Doubet; Andre M. Gibbs (57) ABSTRACT

Techniques are disclosed for enabling users to define one or more areas of a graphical user interface ("GUI") as being "glue-like". When the user moves a pointing device (e.g., a mouse, joystick, track ball, etc.) and as a result, the graphical pointer moves into a painted area, the speed at which the graphical pointer will then traverse the GUI is programmatically slowed. Upon exiting the painted area, the graphical pointer speed is preferably restored to its prior setting. In this manner, the user achieves user-specific, application-independent control over the speed at which the graphical pointer moves.

7 Claims, 6 Drawing Sheets

USER-DEFINED ASSISTIVE GUI GLUE

BACKGROUND OF THE INVENTION

1. Field of the Invention

The present invention relates to a computer system, and deals more particularly with techniques for more enabling users to define one or more areas of a graphical user interface ("GUI") as being "glue-like", thereby causing the cursor or graphical pointer to slow down so that the user is able to achieve better control thereof.

2. Description of the Related Art

Use of computers and various types of application software has become pervasive in the work environment as well as in everyday life. Many people experience difficulty in physically interacting with computers and the devices that provide an interface to application software. An inability to control a pointing device (such as a mouse) with fine motor skills may occur, whether due to degradation of coordination or a lack of coordination. This inability may prevent the person from accomplishing common tasks, or cause great difficulty with performing tasks, such as making selections from a menu or a task bar. Many menus, such as the "Start" program menu available in the Windows® operating system, have relatively narrow regions of selectability for each of the menu's choices. ("Windows" is a registered trademark of Microsoft Corporation in the United States, other countries, or both.) Similarly, task bars may contain a number of relatively small selectable icons, where these icons are located in close proximity to one another. Persons with limited fine motor skills, including children, the elderly, or those suffering with nerve disorders (such as Parkinson's disease), may be able to position the graphical pointer corresponding to the pointing device into the general area of the display device where they wish to make a selection, but may have difficulty with more specific component selections (such as choosing a particular icon from a task bar or a making a particular choice from a menu).

Accordingly, what is needed are techniques for enabling users to have better control over selections made on the interface to software applications.

SUMMARY OF THE INVENTION

An object of the present invention is to provide techniques for enabling users to have better control over selections made on the interface to software applications.

It is another object of the present invention to provide techniques for allowing end users to define areas of a user interface where the speed of the graphical pointer corresponding to pointing device movement should be slowed.

Another object of the present invention is to provide techniques for defining or marking these areas of a user interface in an application-independent manner.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides methods, systems, and computer program products for altering, in user-selected areas of a displayed application software interface, speed of a graphical pointer corresponding to movement of a pointing device. In one aspect of preferred embodiments, user-defined assistive GUI glue is provided using techniques that comprise: enabling a user to mark one or more user-selected areas of a GUI; programmatically detecting when a graphical pointer that corresponds to movement of a pointing device moves into one or more of the marked areas; displaying, on the GUI responsive to the programmatically detecting, a visual indicator over each of the one or more marked areas in which the graphical pointer is currently located; and programmatically slowing a speed of the graphical pointer, relative to movement of the pointing device, responsive to the programmatic detection, and maintaining the programmatically-slowed speed and the displayed visual indicator until programmatically detecting that the graphical pointer is no longer located in any of the marked areas.

The technique may further comprise sounding an audible indicator while the graphical pointer is located in any of the marked areas. The programmatic slowing of the graphical pointer may slow the speed by a user-defined factor, by a fixed percentage, etc. Optionally, the speed may be slowed by one factor if the graphical pointer is located within a single one of the marked areas and by a different factor if the graphical pointer is located within more than one of the marked areas. Preferably, the marking of the areas occurs in a setup phase and the programmatic detection, displaying, and programmatic slowing occur in an operational phase.

In another aspect of preferred embodiments, a speed of a graphical pointer that correlates to manipulation of a pointing device is adjusted, in a user-specific manner. This technique preferably comprises: enabling a user to mark at least one user-selected area of a displayed GUI where the speed of the graphical pointer should be slowed; programmatically moving the graphical pointer according to a first relationship responsive to detecting that the graphical pointer is located in any of the marked areas and displaying, on the GUI responsive to the detecting, a visual indicator over each of the one or more marked areas in which the graphical pointer is currently located; and programmatically moving the graphical pointer according to a second relationship and not displaying the visual indicator otherwise, wherein the first relationship and the second relationship both correlate manipulation of the graphical pointing device to the speed at which the graphical pointer moves and the speed for the first relationship is slower than the speed for the second relationship.

The present invention may also be used advantageously in methods of doing business, for example by providing a service for adapting software to be used by those having limited fine motor skills or by providing such adapted software as a service to end users. Such services may be provided under various revenue models, such as pay-per-use billing, monthly or other periodic billing, and so forth.

The present invention will now be described with reference to the following drawings, in which like reference numbers denote the same element throughout.

DESCRIPTION OF PREFERRED EMBODIMENTS

The present invention provides techniques for enabling a person to "paint" (i.e., define or mark) selected areas of a user interface with a virtual regional field or area that affects the speed of the graphical pointer (e.g., cursor) that corresponds to movement of a pointing device (such as a mouse, light pen, joystick, track ball, and so forth). This effectively causes movement of the graphical pointer to slow down in the painted areas, relative to movement of the pointing device, as if a more dense or "glue-like" area of the displayed interface has been entered. Thus, the assistive technology provided by the present invention may be referred to as "GUI glue".

A user, or an assistant or guardian of a user, may choose to slow the graphical pointer in commonly-used areas such as the Start menu or task bar. Areas that need such attention are selectable in a user-specific manner, allowing for rapid pointer movement and navigation in areas that do not require such assistance (e.g., areas of the GUI where icons are relatively distant from one another). The disclosed techniques are particularly advantageous for users who are unable to control their movement of the pointing device with precision. Users afflicted with Parkinson's disease, for example, may cause a mouse to move somewhat jerkily, and may be physically unable to cause the mouse to move only a slight amount. Using the disclosed techniques, such jerky or large movements of the physical pointing device cause only a slight movement (or at least a relatively smaller movement) of the graphical pointer when positioned within a GUI glue area, thereby giving the user a much greater likelihood of being able to accurately select something displayed on the GUI.

Figure 1A:
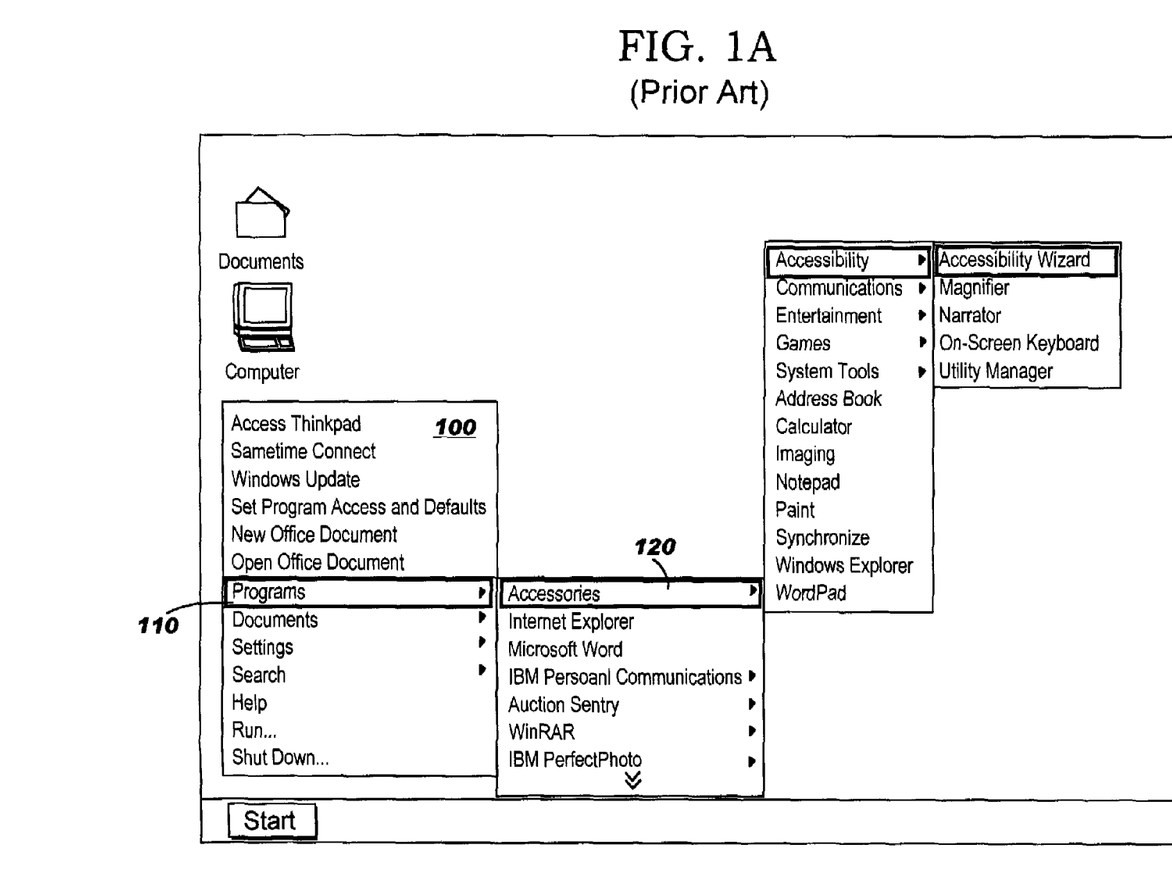
FIGS. 1A and 1B illustrate sample selection menus and task bars of the prior art, respectively.
Figure 1B:
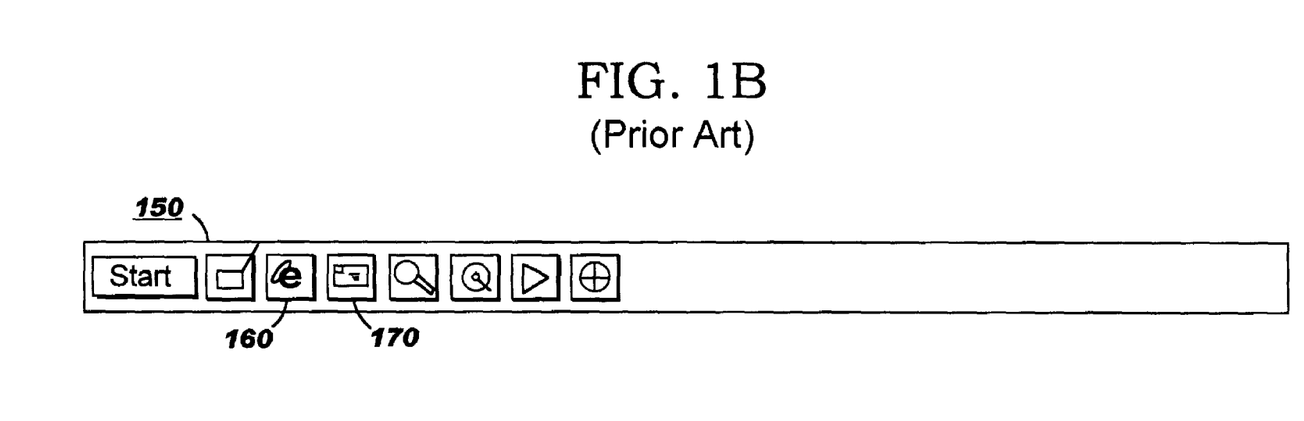

FIG. 1A shows a sample selection menu 100 of the prior art, and FIG. 1B shows a sample task bar 150 of the prior art. Even when the user interface is displayed on a relatively large device, such as a 19-inch display screen, the width of an individual menu choice (as shown at reference numbers 110, 120) in a selection menu 100 (see FIG. 1A) is on the order of one-quarter of an inch, and the width of a representative icon (see reference numbers 160, 170) in a task bar 150 (see FIG. 1B) is even smaller. A user who intends to select one menu choice or icon, but who is unable to move the pointing device in such a way as to precisely control movement of the graphical pointer within such a limited amount of space, may experience a great deal of frustration as he inadvertently selects a neighboring menu choice or icon. And, for the wide variety of devices that present the user interface in a smaller size (such as a laptop computer or personal digital assistant), the problem may be exacerbated.

Prior art techniques allow users to slow down the speed of the graphical pointer globally, or over-correct the movement of the graphical pointer globally. For example, the speed of the cursor corresponding to mouse movement may be adjusted through the control panel when using the Windows operating system.

Other prior art techniques are known whereby an area of a user interface is "sticky", and speed of the graphical pointer is adjusted with reference to the sticky area. Several of these techniques will now be described.

U.S. Pat. No. 5,786,805, titled "Method and apparatus for improving object selection on a computer display by providing cursor control with a sticky property", teaches automatically adjusting pointing device sensitivity in a defined range on or around an object. Whether a particular object is treated as having this "sticky" property depends on the cursor position (whether the cursor is over or near a selectable object), cursor dynamics (e.g., velocity or acceleration of the cursor), size or extent of a selectable object, or a global setting that determines stickiness based on classes of selectable display objects. With regard to cursor dynamics, if the cursor is detected as moving too fast, this may be interpreted as indicating that the user does not want to select a nearby object, causing the stickiness of that object to be disabled; or, if the cursor is detected as moving slowly, this may be interpreted as indicating that the user is trying to select a nearby object, in which case the stickiness of the object is enabled.

U.S. Pat. No. 5,732,228, "Method and system for per-widget graphical pointer control within a data processing system graphical user interface", teaches techniques whereby a user may define per-widget control over a graphical pointer. Upon a user requesting to adjust the traversal rate of a graphical pointer within a GUI display, a region of the GUI is selected from a displayed list, where these regions include each currently-open window as well as the desktop itself. The graphical features of the GUI, including the icons displayed in the selected region, are then presented to the user in selection windows. The user may choose any of these features as a widget, and then selects a speed (such as "sticky" or "warp", or a relative speed selected using a slider bar) for the graphical pointer. This defines a first relationship that correlates manipulation of a graphical pointing device and movement of a graphical pointer when the graphical pointer is displayed at positions within the widget. Conversely, when the graphical pointer is located outside the widget, then a second relationship correlates manipulation of the pointing device with movement of the graphical pointer.

U.S. Pat. No. 5,710,574, "Method and system for positioning a graphical pointer within a widget of a data processing system graphical user interface", is similar. However, this patent teaches that the first relationship and second relationship apply to a first region and second region within the widget.

U.S. Pat. No. 5,508,717, "Computer pointing device with dynamic sensitivity", teaches using different speed factors for a pointer controlled by mouse movement, depending on whether or not the pointer is within a control zone (such as an icon). The user may define the different speed factors, or one speed factor may be some predetermined fraction of another.

The present invention, on the other hand, provides for a user-selectable definition of the GUI glue area or areas of a user interface, and movement of the graphical pointer is then programmatically slowed within the defined area(s).

Figure 2A:
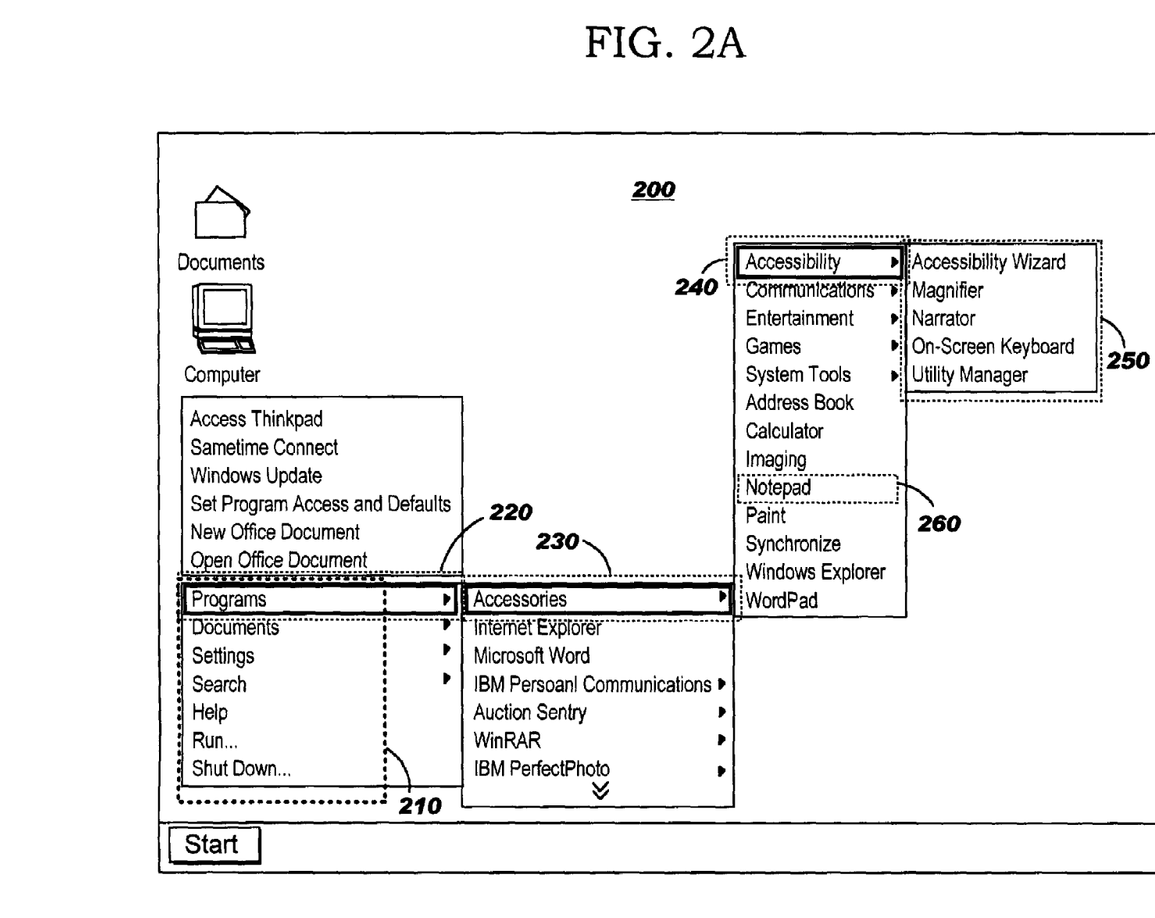
FIGS. 2A and 2B depict how the sample selection menu and task bar of FIGS. 1A and 1B might appear after having been marked to indicate that a particular user wishes the graphical pointer speed to be slowed, according to the present invention.
Figure 2B:
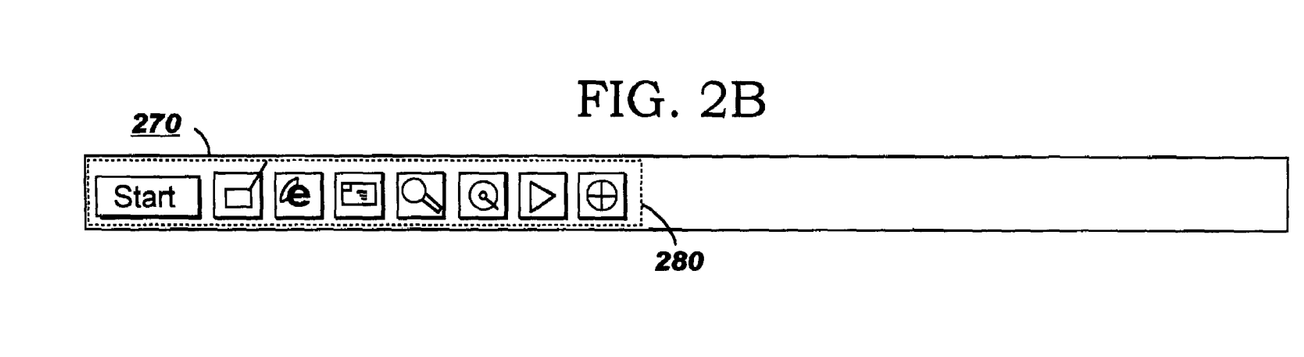

Referring now to FIGS. 2A and 2B, visual markings are shown to indicate how the sample selection menu 100 and task bar 150 of FIGS. 1A and 1B might appear after the user (or user's assistant) has painted the areas that are to appear glue-like, according to the present invention. In the sample painted selection menu 200 of FIG. 2A, the painted areas are 210, 220, 230, 240, 250, and 260. Painted areas 210, 220, 230, 240 provide a path for the user to get to the accessibility options shown in the menu at 250. Painted area 260 is reachable through the painted path 210, 220, 230, and provides access to the "Notepad" application. Thus, these painted areas indicate that the graphical pointer should move more slowly, for this user, when placed in these painted areas of the user interface. The sample task bar 270 of FIG. 2B has been entirely painted, in this example, as shown by the marking at 280, indicating that this user wants the graphical pointer to move across the task bar's icons as though they are covered with glue.

One manner in which the areas to be painted for a particular user may be defined is described below with reference to FIG. 4A.

Figure 3A:
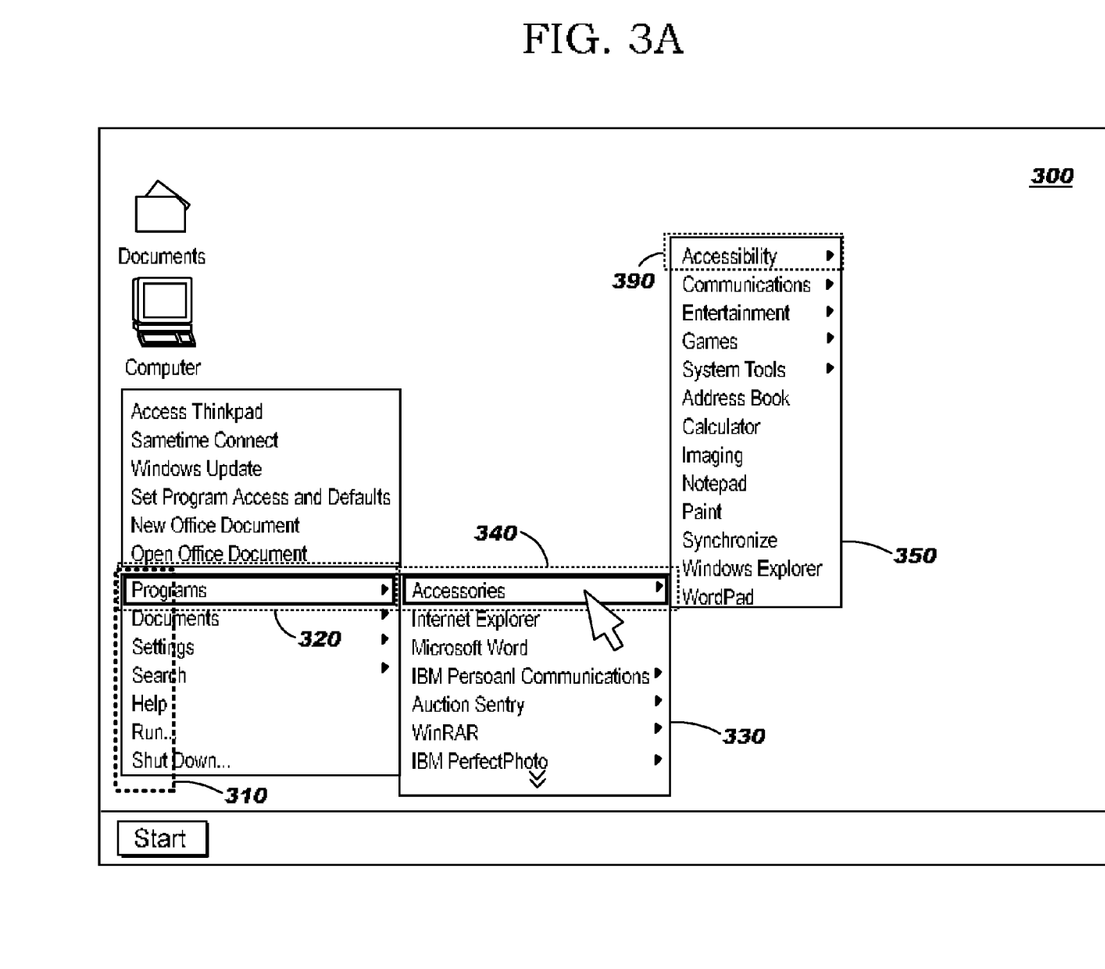
FIGS. 3A and 3B show markings that represent a user interacting with an interface that has areas defined according to the present invention.
Figure 3B:
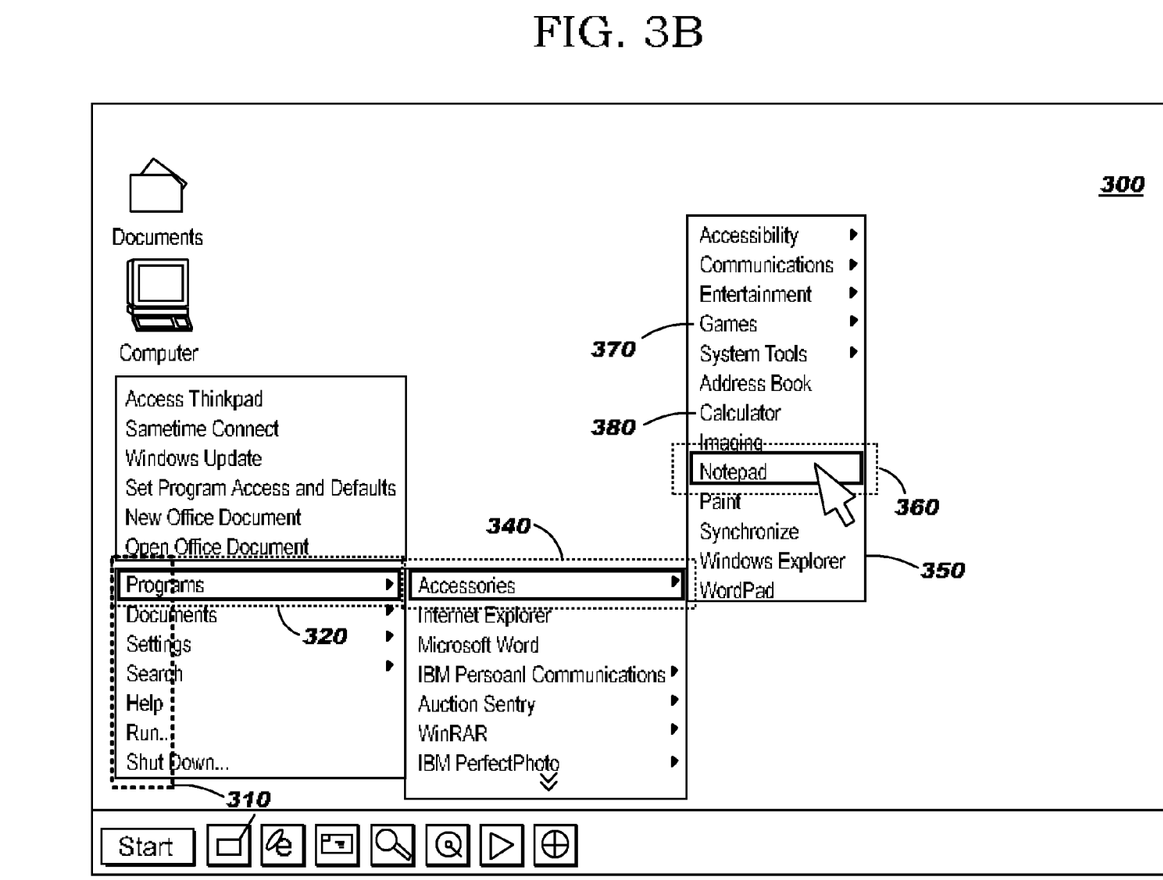

FIGS. 3A and 3B show examples of how a GUI glue-marked user interface 300 might appear in actual operation. According to preferred embodiments, the glue-marked areas display a visual indicator once the graphical pointer moves into the painted area (or otherwise activates a painted area), but not while the graphical pointer is located elsewhere on the user interface. (This serves to reduce "visual clutter", and allows the user to better focus on his task of interest.) In the example selection menu 300 of FIG. 3A, the user has activated the pop-up Start menu, causing a visual indicator 310 to be shown over the Programs/Documents/Settings/Search/Help/Run . . . /Shut Down . . . area that was previously painted (see reference number 210 of FIG. 2A). In this example selection menu 300, the visual indicators also show that the Programs choice has been activated (see reference number 320), and that the Accessories choice has then been activated (see reference number 340) from the menu 330 popped up in response to choosing Programs. In this case, the user has not yet activated any selection from the menu 350 popped up in response to choosing Accessories.

In FIG. 3B, the visual indicators show that the user has made the same selections as in FIG. 3A, but has continued on to select (i.e., activate) the Notepad choice. See reference number 360. As stated above, use of the present invention allows the user to identify those areas where he wants the graphical pointer to slow down, and in other areas, the graphical pointer will continue to move rapidly. For example, this user might not tend to play any computer games, or to use his computer as a calculator, and thus does not want the graphical pointer to slow down when it passes over Games 370 or Calculator 380 choices from the Accessories pop-up menu 350. But, having the GUI glue action in the painted areas, the user has a much greater likelihood of being able to select the Accessibility choice 390 and the Notepad choice 360 from this displayed pop-up menu 350.

A variety of visual indicators may be used to denote which areas have been painted with GUI glue. For example, colored shapes might be displayed surrounding an area of GUI glue. Audible markings may be provided in addition to, or instead of, such visual indicators. For example, a sound may be emitted to notify the user that the graphical pointer is now changing speed. Thus, the examples of visual indicators used herein are merely for purposes of illustration and drafting convenience.

Figure 4A:
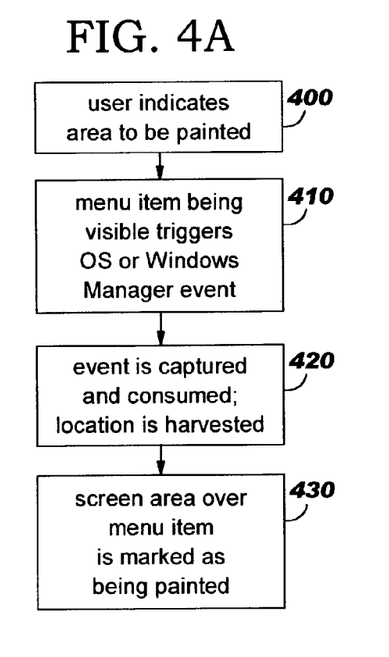
FIGS. 4A and 4B provide flowcharts illustrating logic that may be used to implement the user-specific, application-independent slowing of the graphical pointer, according to preferred embodiments.
Figure 4B:
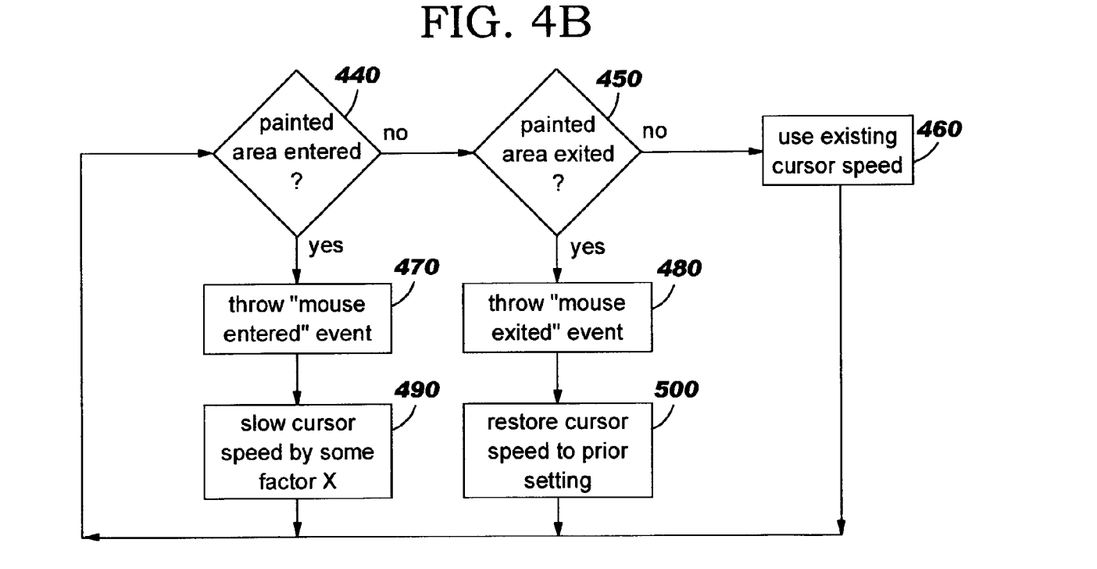

Reference is now made to FIGS. 4A and 4B, where terminology of a Java™-centric model is used in describing operation of preferred embodiments. ("Java" is a trademark of Sun Microsystems, Inc.) As will be obvious, this is merely one model that may be used, and thus this description is by way of illustration and not of limitation.

In FIG. 4A, logic is provided that may be used by an implementation of the present invention when defining or painting the areas of the user interface that are to behave in a glue-like manner. At Block 400, a user (who may be the end user, or an assistant for the user, etc.) indicates an area of the user interface that he wishes to paint. Preferably, this is done using conventional means for marking areas of a GUI or selecting one or more graphical elements (e.g., icons, buttons, menu choices, and so forth). In one approach, a mouse button is depressed, and this button is held down while dragging the mouse, resulting in a rectangular selection area (that is, a rectangular area which is interpreted as selecting each graphical element located therein). The task bar 150 of FIG. 1B might be painted in this manner, for example, by defining a rectangle that encompasses each of the task bar's icons, as shown in FIG. 2B. Similarly, areas 210 and 250 of FIG. 2A may have been defined as painted areas using this approach. In another approach, one or more displayed graphical elements may be individually selected, for example by holding down the Shift or Control key and then clicking on icons that are to be selected. In this approach, each of the selected graphical elements is then preferably interpreted as an element to be painted. User-selected areas of the selection menu 100 of FIG. 1A might be painted in this manner, resulting in (for example) painted areas 220, 230, 240, and 260 as shown in FIG. 2A. Other techniques for identifying boundaries of a GUI glue area may be used without deviating from the scope of the present invention.

The menu item being visible preferably triggers an operating system event (using prior art techniques), as shown at Block 410; or, in the case of the Windows operating system, a Windows Manager event may be triggered (also using prior art techniques). This event is then captured and consumed, according to preferred embodiments, and the location information from the event is harvested (Block 420). This location information is used (Block 430) to determine the area of the GUI that is to be marked as having been painted by the user. The logic in FIG. 4A may be repeated, as needed, until all of the glue-like areas have been defined.

FIG. 4B provides logic indicating how an implementation may process graphical pointer movement in view of the GUI glue areas. Block 440 tests to see if the graphical pointer has just entered a painted area. If so, then a "mouse entered" event is thrown (Block 470), and the speed of the graphical pointer (referred to in FIG. 4B as a "cursor") is slowed (Block 490) by some factor "X". The value of this factor may be determined in several different ways. As examples, an option may be provided for individual users to define a value for X, or an implementation may predefine a value (such as 50 percent). The slowing of the graphical pointer may be represented visually (for example) by moving the cursor only half as far, for a given movement of the pointing device, as the cursor would normally travel for the same movement of the pointing device. The logic in FIG. 4B is then shown as returning to Block 440, indicating that the location of the graphical pointer continues to be monitored.

If the test in Block 440 has a negative result (i.e., the graphical pointer did not just enter a painted area), then control reaches Block 450, which checks to see if the graphical pointer has just exited a painted area. If so, then a "mouse exited" event is thrown (Block 480), and the speed is restored to its prior setting (Block 500). Control then returns to Block 440.

If the graphical pointer has not just entered or exited a painted area, then control reaches Block 460, which indicates that the speed of the graphical pointer is maintained at its existing speed (which will be the slower speed if the pointer remains within a painted area, and the faster speed if the pointer remains outside painted areas).

In an optional aspect, an implementation of the present invention may monitor overlapping painted areas, and provide special treatment for the graphical pointer speed in these overlapping areas. For example, the speed may be slowed by a factor of (X times the number of overlapping areas at the current location of the graphical pointer), to provide an "extra slow" movement. With reference to the example selection menu 200 in FIG. 2A, one such overlapping area is shown at the intersection of painted areas 210 and 220. This may be interpreted, in this optional aspect, as indicating that the user wants the graphical pointer to move slowly while he chooses among Programs, Documents, Settings, Search, Help, Run . . . and Shut Down . . . , and that if he then chooses Programs, he wants the graphical pointer movement to be even slower.

It may happen that a painted area is moved or redefined. For example, a painted icon may be moved to a different place on the GUI; or, a window might be resized, moved to another location on the GUI, or minimized/maximized. Operating system events are triggered, according to the prior art, for these types of changes. A "window changed" event may be triggered upon minimizing or maximizing a window, for example, and a "hierarchical change" event might be triggered if a window is resized. An implementation of the present invention may respond to such events by rerunning the logic of FIG. 4A. Alternatively, the painted areas may be automatically moved to correspond to the new location of the graphical elements contained therein.

As will be appreciated by one of skill in the art, embodiments of the present invention may be provided as methods, systems, computer program products, and/or methods of doing business. Accordingly, the present invention may take the form of an entirely hardware embodiment, an entirely software embodiment, or an embodiment combining software and hardware aspects. Furthermore, the present invention may take the form of a computer program product which is embodied on one or more computer-usable storage media (including, but not limited to, disk storage, CD-ROM, optical storage, and so forth) having computer-readable program code embodied therein.

The present invention has been described with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

While preferred embodiments of the present invention have been described, additional variations and modifications in those embodiments may occur to those skilled in the art once they learn of the basic inventive concepts. Therefore, it is intended that the appended claims shall be construed to include preferred embodiments as well as all such variations and modifications as fall within the spirit and scope of the invention.

What is claimed is:

1. A method of providing user-defined assistive graphical user interface ("GUI") glue, comprising steps of:
    enabling a user to mark a plurality of user-selected areas of a GUI, wherein at least one area of the GUI is not included in any marked area;
    programmatically detecting when a graphical pointer that corresponds to movement of a pointing device moves into one or more of the marked areas;
    displaying, on the GUI responsive to the programmatically detecting step, a visual indicator over each of the one or more marked areas in which the graphical pointer is currently located; and
    programmatically slowing a speed of the graphical pointer, relative to movement of the pointing device, responsive to the programmatically detecting step, by a first factor if the graphical pointer is currently located in a single one of the marked areas and by a different factor if the graphical pointer is currently located in overlapping ones of the marked areas and maintaining the programmatically-slowed speed and the displayed visual indicator until programmatically detecting that the graphical pointer is no longer located in any of the marked areas.

2. The method according to claim 1, wherein the visual indicator further comprises a colored shape placed over each of the one or more marked areas in which the graphical pointer is currently located.

3. The method according to claim 1, further comprising the step of sounding an audible indicator while the graphical pointer is located in any of the marked areas.

4. The method according to claim 1, wherein at least one of the first factor and the different factor is a user-defined factor.

5. The method according to claim 1, wherein at least one of the first factor and the different factor is a fixed percentage.

6. The method according to claim 1, wherein the enabling step occurs in a setup phase and the programmatically detecting, displaying, and programmatically slowing steps occur in an operational phase.

7. A method of adjusting, in a user-specific manner, a speed of a graphical pointer that correlates to manipulation of a pointing device, comprising steps of:
    enabling a user to mark a plurality of user-selected areas of a displayed graphical user interface ("GUI") where the speed of the graphical pointer should be slowed, wherein at least one area of the GUI is not included in any marked area;
    programmatically moving the graphical pointer according to a first relationship responsive to detecting that the graphical pointer is moved into a single one of the marked areas and displaying, on the GUI responsive to the detecting, a visual indicator over the single marked area in which the graphical pointer is currently located;
    programmatically moving the graphical pointer according to a second relationship responsive to detecting that the graphical pointer is moved into overlapping ones of the marked areas and displaying, on the GUI responsive to the detecting, the visual indicator over each of the overlapping marked areas in which the graphical pointer is currently located; and
    programmatically moving the graphical pointer according to a third relationship and not displaying the visual indicator when the graphical pointer is not detected as moving into any of the marked areas, wherein:
    the first relationship, the second relationship, and the third relationship each correlate manipulation of the graphical pointing device to the speed at which the graphical pointer moves;
    the speed for the second relationship is slower than the speed for the first relationship; and
    the speed for the first relationship is slower than the speed for the third relationship.

* * * * *